(12) United States Patent
Yang et al.

(10) Patent No.: US 10,156,470 B2
(45) Date of Patent: Dec. 18, 2018

(54) WEIGH MODULE WITH PARALLEL-GUIDING MECHANISM MODULE

(71) Applicant: Mettler-Toledo GmbH, Greifensee (CH)

(72) Inventors: Chun Yang, Shanghai (CN); Chao Wu, Shanghai (CN); Feng Xu, Shanghai (CN); Weixiang Sun, Shanghai (CN); Naifeng Bian, Shanghai (CN); Hans-Rudolf Burkhard, Wila (CH)

(73) Assignee: Mettler-Toledo GmbH, Greifensee (CH)

( * ) Notice: Subject to any disclaimer, the term of this patent is extended or adjusted under 35 U.S.C. 154(b) by 40 days.

(21) Appl. No.: 15/320,915

(22) PCT Filed: May 23, 2016

(86) PCT No.: PCT/EP2016/061592
§ 371 (c)(1),
(2) Date: Dec. 21, 2016

(87) PCT Pub. No.: WO2016/188960
PCT Pub. Date: Dec. 1, 2016

(65) Prior Publication Data
US 2017/0131135 A1 May 11, 2017

(30) Foreign Application Priority Data

May 26, 2015 (CN) .......................... 2015 1 0273989
May 26, 2015 (CN) ..................... 2015 2 0346256 U

(51) Int. Cl.
*G01G 21/24* (2006.01)

(52) U.S. Cl.
CPC ................................. *G01G 21/244* (2013.01)

(58) Field of Classification Search
CPC ........................................................ G01G 21/24
(Continued)

(56) References Cited

U.S. PATENT DOCUMENTS

| 4,799,561 A * | 1/1989 | Komoto .................... G01G 3/14 177/212 |
| 6,374,682 B1 * | 4/2002 | Burkhard ............. G01G 21/244 73/472 |

(Continued)

FOREIGN PATENT DOCUMENTS

| DE | 3832747 A1 | 6/1989 |
| DE | 29813211 U1 | 10/1998 |

(Continued)

*Primary Examiner* — Natalie Huls
*Assistant Examiner* — Monica S Young
(74) *Attorney, Agent, or Firm* — Standley Law Group LLP

(57) ABSTRACT

A parallel-guiding mechanism in accordance with the present invention comprises a load-receiving portion for receiving a load of a to be weighed object; a fixing portion including an end portion, an extending portion extending forwardly from the end portion and mounting portions extending forwardly from the extending portion, and parallel-guiding members connecting the load-receiving portion to the fixing portion. The mounting portions include a first mounting portion and a second mounting portion. A receiving space is formed between the first mounting portion, the second mounting portion and the extending portion for receiving at least a portion of the load-receiving portion. A containing space for receiving the extending portion is formed between the parallel-guiding members, the load-receiving portion and the end portion. The parallel-guiding members include an upper parallel-guiding member and a lower parallel-guiding member. The load-receiving portion, (Continued)

the fixing portion and the parallel-guiding members are formed integrally of one piece of solid material.

13 Claims, 6 Drawing Sheets

(58) Field of Classification Search
USPC .......................................................... 177/255
See application file for complete search history.

(56) References Cited

U.S. PATENT DOCUMENTS

| | | |
|---|---|---|
| 6,472,618 B1 * | 10/2002 | Izumo ...................... G01G 7/02 |
| | | 177/210 EM |
| 6,886,418 B2 | 5/2005 | Metzger et al. |
| 8,766,113 B2 | 7/2014 | Kusumoto et al. |
| 2002/0038729 A1 * | 4/2002 | Watabiki .............. G01G 21/244 |
| | | 177/229 |

FOREIGN PATENT DOCUMENTS

| | | |
|---|---|---|
| DE | 20007781 U1 | 12/2000 |
| DE | 102005033952 A1 | 2/2007 |
| JP | 11-51756 A | 2/1999 |

* cited by examiner

WEIGH MODULE WITH PARALLEL-GUIDING MECHANISM MODULE

TECHNICAL FIELD

The invention relates to a weigh module with a parallel-guiding mechanism, and especially to a weigh module used in an electronic balance.

BACKGROUND ART

A present weigh module used in electronic balances mainly bases on the principle of electromagnetic force compensation. It consists of a large number of die cast parts and other mechanical parts assembly. Although the production technology is mature, with the development of technology improvement, requirements need to be put forward on weigh module used in electronic balances, such as smaller size, higher precision, wider weighing range, lower costs, more simple assembly and the like. As a result, a traditional weigh module assembled by a large number of die cast parts and other mechanical parts is restricted by the development of technology (hereinafter referred to as the whole assembly type weigh module) due to large volume, multiple components, complex assembly, big assembly tolerance, unstable quality.

There are manufacturers that produce highly integrated one-piece weigh modules, module as disclosed in U.S. Pat. No. 6,886,418 B2, DE 20 007 781 U1 or US 2011 10 315 458 A1. The main structure such as the load-receiving portion, the lever, the fixing portion, and the parallel-guiding members are separated by the narrow wire cutting groove or grooves of CNC machining. But the process is complex, high rejection rate, cost of the machining are relatively high. Some manufacturers also produce semi-integrated weigh modules, a weigh module of this type is disclosed for example in U.S. Pat. No. 6,472,618 B1. The main structure such as the load-receiving portion, the fixed portion, and the parallel-guiding members are integrated structure formed by machining, but the structure layout is unreasonable, because of inconvenient assembly and difficulties to achieve a large lever ratio with one single lever.

One kind of parallel-guiding mechanism for an electronic balance includes a load-receiving portion, an end portion and parallel-guiding members connecting the load-receiving portion to the end portion. The load-receiving portion, the end portion and the parallel-guiding members are assembled by thread joint. This kind of assembly needs a lot of time in assembling.

JPH 11 0 51756 discloses a weigh module including a support base, a lever and a parallel-guiding mechanism, which includes a load-receiving portion, a fixing portion and parallel-guiding members. The load-receiving portion and the fixing portion are connected by the parallel-guiding members namely by an upper parallel-guiding member and a lower parallel-guiding member. The parallel-guiding mechanism further includes a mounting member on the load-receiving portion that disposes outside of the space formed between the upper parallel-guiding member and the lower parallel-guiding member. The lever is connected to the mounting member of the load-receiving portion by a force-transmitting member forming a fulcrum mechanism. This kind of weigh module occupies a large volume. The mounting member is mounted to the end portion by thread joint, it takes a lot of time to assemble them together and the accuracy is lowed.

In order to solve these shortcomings, this invention provides an improved weigh module in order to overcome the defects in the prior art.

SUMMARY OF INVENTION

The invention provides a parallel-guiding mechanism that has a small volume and has a compact arrangement, is easy to manufacture, with low costs and high performance. The invention also provides a weigh module that has a small volume and has a compact arrangement, easy assembly and manufacture, with low costs and high performance.

A parallel-guiding mechanism in accordance with the present invention comprises a load-receiving portion for receiving a load of a to be weighed object; a fixing portion including an end portion, an extending portion extending forwardly from the end portion and mounting portions extending forwardly from the extending portion, and parallel-guiding members connecting the load-receiving portion to the fixing portion. The mounting portion includes a first mounting portion and a second mounting portion. A receiving space is formed between the first mounting portion, the second mounting portion and the extending portion for receiving at least a portion of the load-receiving portion. A containing space for receiving the extending portion is formed between the parallel-guiding members, the load-receiving portion and the end portion. The parallel-guiding members including an upper parallel-guiding member and a lower parallel-guiding member. The load-receiving portion, the fixing portion and the parallel-guiding members are formed integrally of one piece of solid material. This design allows the parallel-guiding mechanism having the advantages of compact structure, high strength and stiffness, small volume, good performance, easy assembly and simple processing.

A weight module comprises a lever, a parallel-guiding mechanism as described herein, a force-transmitting member connecting the load-receiving portion of the parallel-guiding mechanism to the lever, and at least two fulcrum members connecting the first and second supporting portion to the lever. The load-receiving portion, the fixing portion and the parallel-guiding members are formed integrally by machining or die cast molding or machining integrate with die cast molding.

A first mounting face is formed on the front face of the first mounting portion for mounting the first fulcrum member, and a second mounting face is formed on the front face of the second mounting portion for mounting the second fulcrum member. The first mounting face and the second mounting face are co-planer. A third mounting face is formed on the front face of the load receiving portion for mounting the force transmitting member. The third mounting face and the first mounting face are non-coplanar so that a large lever ratio can be achieved. Different distance can be adapted to different weighing ranges.

The load-receiving portion includes a main portion, an attachment portion extending forwardly from the main portion and a connecting portion extending upwardly from the main portion. The cross sectional area of the attachment portion is smaller than that of the main portion so that the accuracy of shape and position tolerances of the third mounting face is easily controlled, weighing performance can be improved and costs are cuted down.

Grooves are designed on both ends of the upper parallel-guiding member and the lower parallel-guiding member. A thin metal sheet has similar effect of forming a bearing. At least one of the groove is divided into two parts. Shape of the thin metal sheet formed between the grooves can be as follows: double or single square structure, double or single arc structure. The arch shaped slot can easily eliminate the influence of the stress concentration and has a good property. The square shaped slot can be easily manufactured and has a low cost.

The width of the upper parallel-guiding member and the lower parallel-guiding member near the end portion is the same as the width of the fixing portion. In the preferred embodiment, the width is bigger than that near the load-receiving portion so that the weighing cell can have a good performance of the corner load.

The lever of the weight module is disposed at the outside of the containing space (14) and is a symmetrical frame and has a good balance property. The lever includes a main portion and an internal calibration supporting member, the main portion and the internal calibration supporting member are formed integrally of one piece of solid material, especially for a large weighing range, the weighing performance is better. In another embodiment, the internal calibration supporting member is connected on the load receiving portion so that the weigh module can have lower costs and provides a better performance, especially for weigh modules that have a medium or low weighing range.

A force transmitting member connects the load receiving portion to the lever as force transmit portion.

Fulcrum members connect the first mounting portion to the lever, the second mounting portion to the lever, respectively, as support point of the lever. The fulcrum members include a first fulcrum member that connects the first mounting portion to the lever and a second fulcrum member that connects the second mounting portion to the lever. The first fulcrum member is disposed at one side of the force transmitting member and the second fulcrum member is disposed at the other side of the force transmitting member. In the preferred embodiment, the first fulcrum member and the second fulcrum member are disposed symmetrically along the force transmitting member.

The invention further provides an electronic balance which includes the weigh module described above.

The weigh module and electronic balance provided by this invention have the following advantage: this invention provides a new weigh module between the whole assembly type weigh module and highly integrated one-piece weigh module. The weigh module has the advantage of simple and reasonable structure, more compact volume and convenient assembly, electronical cost and better performance.

A weigh module comprises a monolithic parallel-guiding mechanism and a lever that includes a frame surrounding the monolithic parallel-guiding mechanism. The monolithic parallel-guiding mechanism comprises a load-receiving portion, a fixing portion including an end portion, an extending portion connecting the end portion to mounting portions which includes a first mounting portion and a second mounting portion. The monolithic parallel-guiding mechanism further comprises parallel-guiding members connecting the load-receiving portion to the fixing portion. The load-receiving portion is movable relative to the load-receiving portion and received in a receiving space between the first mounting portion and the second mounting portion.

Other objects, advantages and novel features of the invention will become more apparent from the following detailed description when taken in conjunction with the accompanying drawings.

BRIEF DESCRIPTION OF DRAWINGS

Details of the holding bin according to the invention will be apparent from the description of the embodiments that are illustrated in the drawings, wherein.

DESCRIPTION OF EMBODIMENTS

Within this description, relative directions refer to a weigh module used in operation, wherein the forward direction is defined as the direction from the end portion to the movable portion, the vertical direction is defined as the direction that is perpendicular to the forward direction and essentially parallel to applied load, wherein the upward direction in the vertical direction is defined as the direction from a plane that is closer to the ground where on which the weigh module is mounted to a plane that is more distant from the latter plane.

Figure 1:
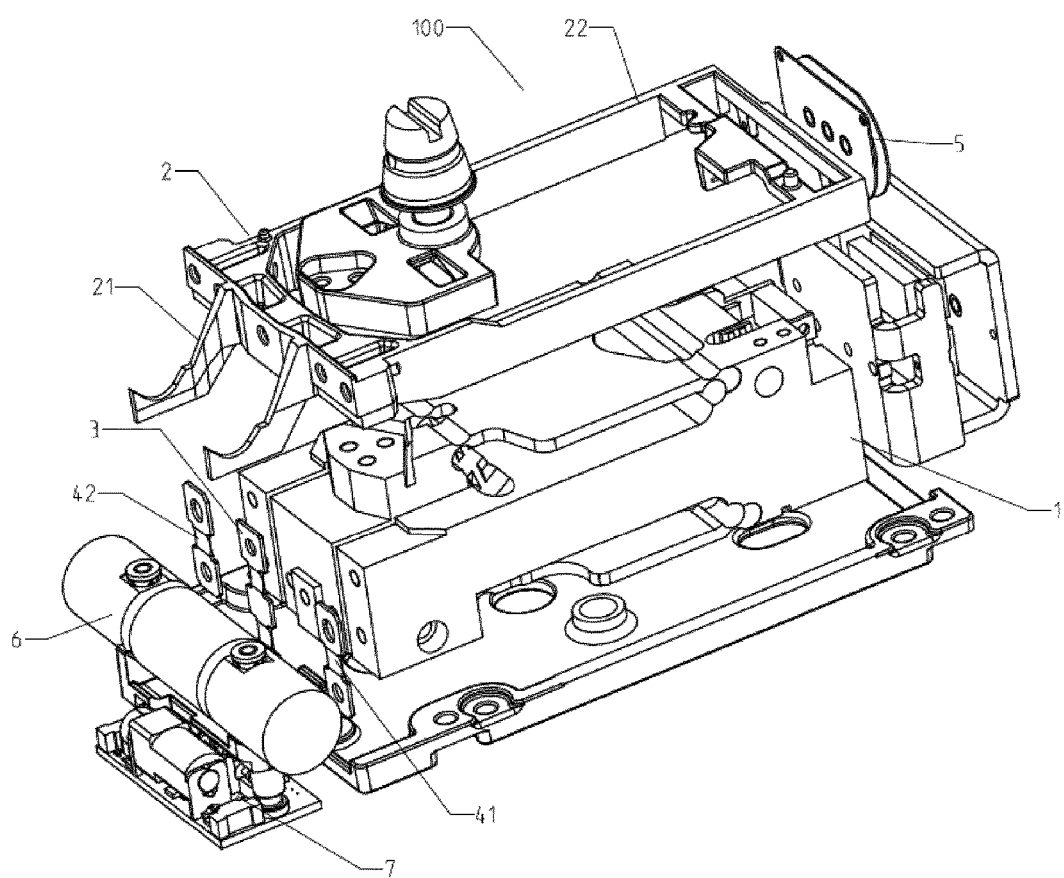
FIG. 1 is a view showing an exploded assembly drawing of the weigh module.

Please refer to FIG. 1, the invention relates to a weigh module 100. The weigh module 100 includes an parallel-guiding mechanism 1, a lever 2, a force-transmitting member 3, fulcrum members 41 and 42, a coil 5, an internal calibration weight 6 and an internal calibration driving member 7.

Figure 2:
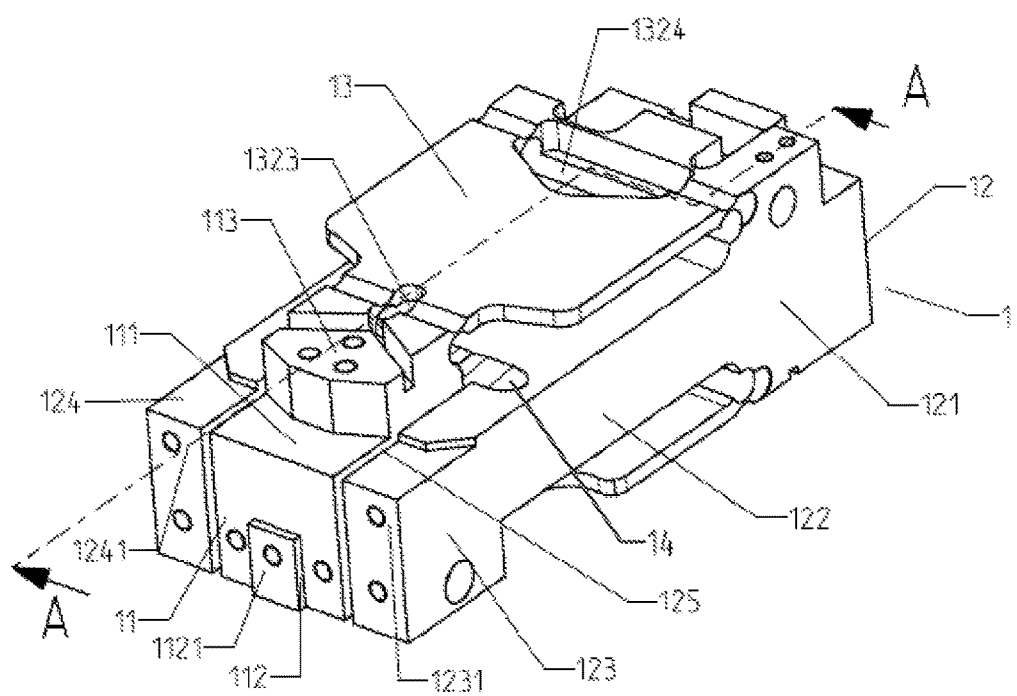
FIG. 2 is a view showing a partially drawing of the parallel-guiding mechanism.
Figure 3:
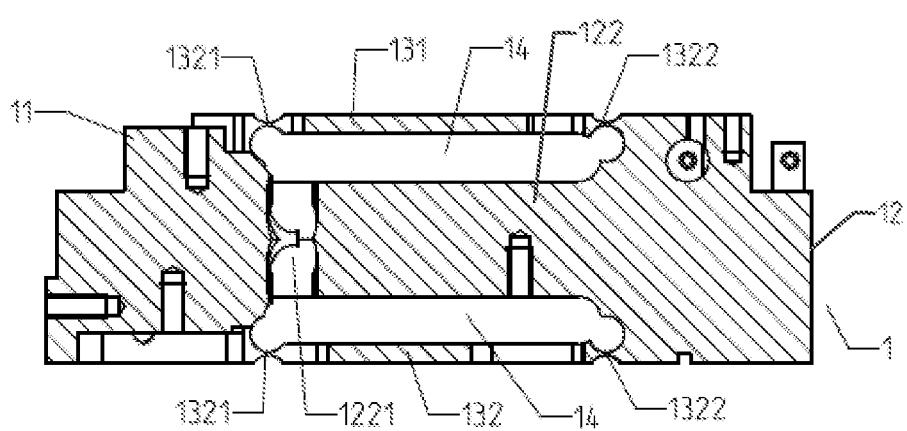
FIG. 3 is a section view of the A-A line in FIG. 2.

With reference to FIG. 2 and FIG. 3, the parallel-guiding mechanism 1 comprises a load-receiving portion 11, a fixing portion 12 and parallel-guiding members 131, 132 connecting the load-receiving portion 11 to the fixing portion 12. The load-receiving portion 11, the fixing portion 12 and the parallel-guiding members 131, 132 are formed integrally by machining or die cast molding or machining integrate with die cast molding so that the weigh module 100 has a simple structure and a small volume, and it can be assembled easily, lower cost and good performance.

The load-receiving portion 11 includes a main portion 111, an attachment portion 112 extending forwardly from the main portion 111 and a connecting portion 113 extending upwardly from the main portion 111. The cross sectional area of the attachment portion 112 is smaller than that of the main portion 111 so that the accuracy of shape and the position tolerances of the third mounting 1121 face can be easily controlled, the weighing performance can be improved and the cost can be lowered.

The fixing portion 12 includes an end portion 121, an extending portion 122 extending forwardly from the end portion 121 and mounting portions extending forwardly from the extending portion 122. The mounting portions 123, 124 including a first mounting portion 123 and a second mounting portion 124. A receiving space 125 is formed between the first mounting portion 123, the second mounting portion 124 and the extending portion 122. A portion of the load-receiving portion 11 is received in the receiving space 125. The receiving space 125 is in between the mounting portions 123, 124. The load-receiving portion 11 is set separately from the first mounting portion 123, the second mounting portion 124 and the extending portion 122, respectively. When a load is supplied to the load-receiving portion 11, the load-receiving portion 11 can move in the receiving space 125 along the vertical direction. In other embodiments, the load-receiving portion 11 can be disposed wholly in the receiving space 125. This setting allows the parallel-guiding mechanism having the advantages of compact structure, high strength and stiffness, small volume, good performance, easy assembly and simple processing.

A first mounting face 1231 is formed on the front face of the first mounting portion 123 for mounting the first fulcrum member 41, and a second mounting face 1241 is formed on the front face of the second mounting portion 124 for mounting the second fulcrum member 42. The first mounting face 1231 and the second mounting face 1241 are co-planer. A third mounting face 1121 is formed on the front face of the load receiving portion 11 for mounting the force transmitting member 3. The third mounting face 1121 and the first mounting face 1231 are non-coplanar so that a large lever ratio can be achieved. Different distance can be adapted for different weighing ranges.

A split hole 1221 is formed between the extending portion 122 and the load receiving portion 11. The split hole 1221 is disposed in the containing space 14 so that the weigh module 100 can have a compact structure. In the prefer embodiment, the split hole 1221 is made by machining.

The parallel-guiding members 131, 132 connecting the end portion 121 to the load-receiving portion 11 and a containing space 14 is formed between them. The extending portion 122 is disposed in the containing space 14 so that the volume of the integrated module 1 is reduced and the material cost is lowered.

The parallel-guiding members 131, 132 including an upper parallel-guiding member 131 and a lower parallel-guiding member 132. A groove 1321 is formed on the upper and/or lower surface of upper parallel-guiding member 131 and/or lower parallel-guiding member 132 near the load-receiving portion 11. A groove 1322 is formed on the upper and/or lower surface of upper parallel-guiding member 131 and/or lower parallel-guiding member 132 near the end portion 121. A thin metal sheet has similar effect of bearing is formed between the grooves. At least one of the grooves 1321, 1322 is divided into two parts. Each groove 1321, 1322 is divided into two parts by an opening 1323, 1324. In other embodiment, the groove 1321, 1322 near the load-receiving portion 11 may not be divided into two parts. When a force is applied to the load receiving portion 11, the parallel guiding structure 13 is forced to move downwardly. Thin metal sheets between 1321 and thin metal sheets between 1322 have an elastic deformation. Because the grooves 1321, 1322 have a good machining accuracy, the corner load error only needs a little adjustment. Shape of the thin metal sheets formed between the grooves 1321, 1322 can be as follows: double or single square structure, double or single arc structure. The arch shaped groove can easily eliminate the influence of the stress concentration and has a good property. The square shaped groove can be easily manufactured and has a low cost.

The width of the upper parallel-guiding member 131 and the lower parallel-guiding member 132 near the end portion 121 is the same as the width of the fixing portion 12. In the preferred embodiment, the width near the end portion 121 is bigger than the width near the load-receiving portion 11 so that the parallel-guiding mechanism 1 can have a good performance of the corner load.

Figure 5:
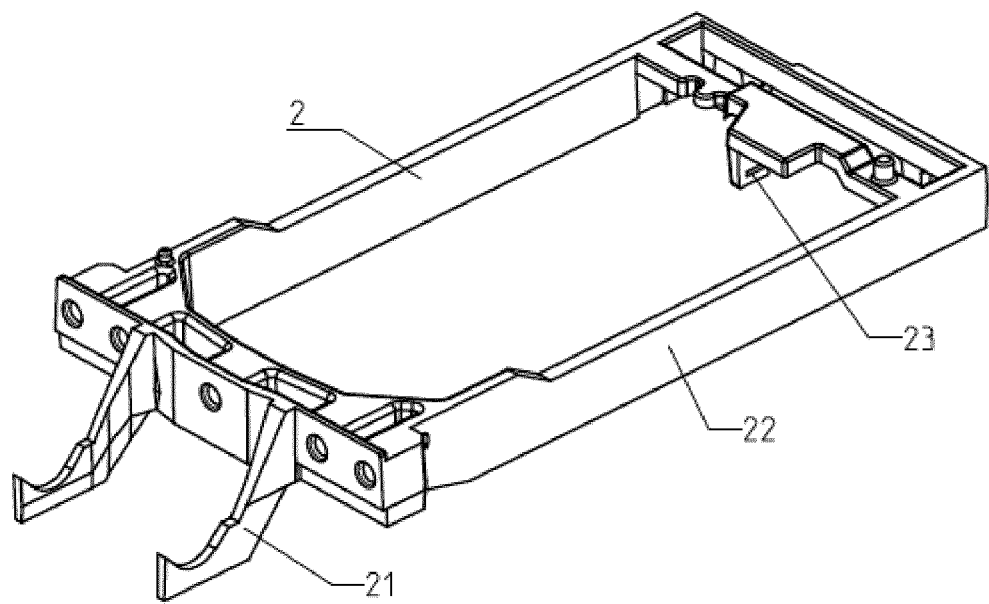
FIG. 5 is a perspective view of the lever.
Figure 6:
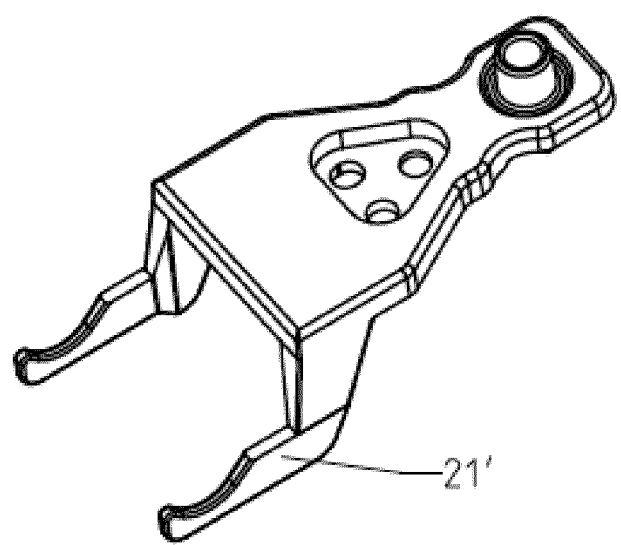
FIG. 6 is a perspective view of the internal calibration supporting member according to another embodiment.

Please refer to FIG. 5, the lever 2 is a symmetrical frame. The lever 2 can have a good balance property. The lever 2 is disposed outside of the containing space 14. The lever 2 includes a frame 22 and an internal calibration supporting member 21, the frame 22 and the internal calibration supporting member 21 are formed integrally, especially for large weighing range, the weighing performance is better. In another embodiment, please refer to FIG. 6, the internal calibration supporting member 21' is connected to the load receiving portion so that the weigh module 100 can have a lower cost and better performance, especially for a weigh module 100 that has a medium or low weighing range.

One end of the force-transmitting member 3 is mounted to the third mounting face 1121, and another end is mounted to the lever 2 as force transmit portion. The force-transmitting member 3 connects the load-receiving portion 11 to the lever 2. When a load is set on the load-receiving portion 11, a force is introduced and transmitted to the lever 2 via the force-transmitting member 3. Then the lever 2 loses the balance. With the amplification of the long arm of lever 2, the photoelectric detecting seam 23 on the end of the lever 2 deviates from the original balance position, the photoelectric displacement sensor detects the luminous flux change through the photoelectric detecting seam 23. The luminous flux change is sent to the weigh module circuit device to produce a corresponding compensation current, which flows through the coil 5 attached on the long arm of the lever 2. A compensation force (or equilibrium force) is produced in fixed magnetic field by coil 5 to bring the photoelectric detecting seam 23 back to the equilibrium state. The compensation current flowing through the coil 5 is measured and processed to determine the actual weight of the load.

In this embodiment, there are two fulcrum members 41, 42. The fulcrum members 41, 42 connect the first mounting portion 123, the second mounting portion 124 to the lever 2, respectively. The fulcrum members 41, 42 include a first fulcrum member 41 that connects the first mounting portion 123 to the lever 2 and a second fulcrum member 42 that connects the second mounting portion 124 to the lever 2. The first fulcrum member 41 is disposed at one side of the force-transmitting member 3 and the second fulcrum member is disposed at the other side of the force-transmitting member 3. In the preferred embodiment, the first fulcrum member 41 and the second fulcrum member 42 are disposed symmetrically along the force-transmitting member 3.

Figure 4:
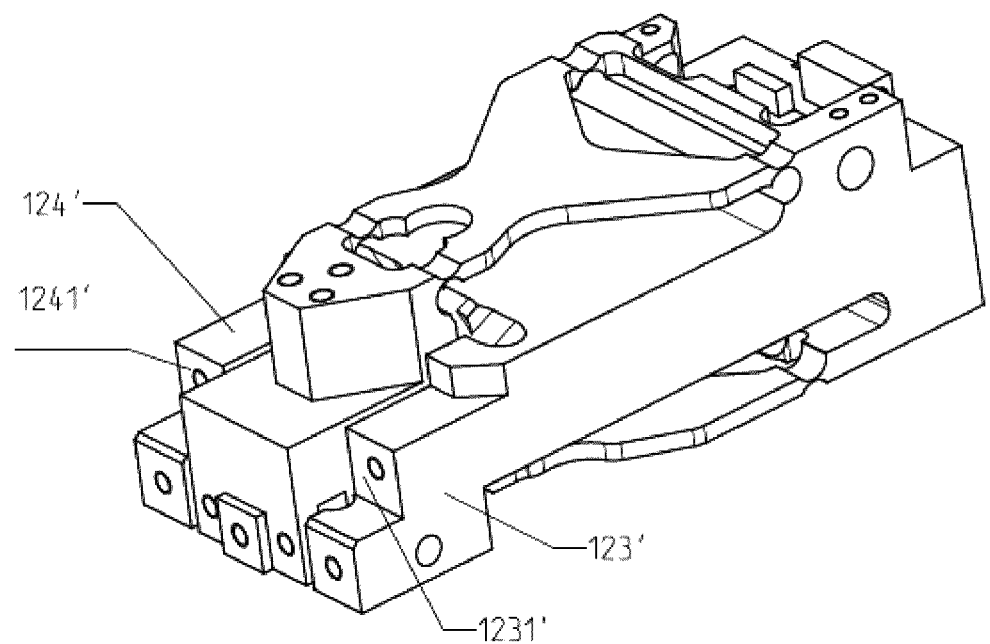
FIG. 4 is a view showing a partially drawing of the parallel-guiding mechanism according to another embodiment.

FIG. 4 is another embodiment of the invention. The difference is that the front face of the first mounting portion 123' and the front face of the second mounting portion 124' is step shaped. The first mounting face 1231' and the second mounting face 1241' offset inwardly from the front face. The one end of the first fulcrum member 41 is mounted on the first mounting face 1231' and the other end is mounted to the lever 2. The one end of the second fulcrum member 42 is mounted on the second mounting face 1241' and the other end is mounted to the lever 2. Via this arrangement, the lever ratio can be changed easily to meet the demand of different weighing ranges.

The invention further provides an electronic balance which includes the weigh module described above so that it has a simple structure, a small volume, a convenient assembly, economical cost and a reliable performance.

As persons skilled in this art may well appreciate, the above description of the preferred embodiment of the present invention is employed for the description, not for the restriction to the present invention. Modifications to the outlined embodiment of the present invention may be apparent and should be considered to be within the scope of the present invention that is recited in the claims.

REFERENCE SIGNS LIST

100 Weighing module
1 Parallel-guiding mechanism
2 Lever
3 Force-transmitting member
41, 42 Fulcrum member 5 Coil
6 Calibration weight
7 Calibration driving member
11 Load-receiving portion
12 Fixing portion
14 Containing space
21, 21' Internal calibration supporting member
22 Frame of lever 2
23 Photoelectric detecting seam (shutter vane)
111 Main portion of load-receiving portion 11
112 Attachment portion
113 Connecting portion
121 End portion
122 Extending portion
123, 123' First mounting portion
124, 124' Second mounting portion
125 Receiving space
131 Upper parallel-guiding member
132 Lower parallel-guiding member
1121 Third mounting face for the force-transmitting member
1221 Split hole
1231, 1231' First mounting face for the first fulcrum member
1241, 1241' Second mounting face for the second fulcrum member
1321 First groove
1322 Second groove
1323 First opening
1324 Second opening

The invention claimed is:

1. A parallel-guiding mechanism comprising:
a load-receiving portion for receiving a load of an object;
a fixing portion, comprising:
   an end portion;
   an extending portion extending forwardly from the end portion; and
   a first mounting portion and a second mounting portion, each of which extends forwardly from the extending portion, and
parallel-guiding members that connect the load-receiving portion to the fixing portion,
wherein a containing space, in which the extending portion is disposed, is formed between the parallel-guiding members, the load-receiving portion and the end portion;
wherein a first receiving space for receiving at least a portion of the load-receiving portion is formed between the first mounting portion and the extending portion and a second receiving space for receiving at least a portion of the load-receiving portion is formed between the second mounting portion and the extending portion;
wherein the load-receiving portion, the fixing portion and the parallel-guiding members are formed integrally of one piece of solid material; and
wherein a split hole that connects the first receiving space with the second receiving space is formed in the containing space between the load-receiving portion and the extending portion.

2. The mechanism according to claim 1, further comprising:
a first mounting face formed on a front face of the first mounting portion;
a second mounting face formed on a front face of the second mounting portion; and
a third mounting face formed on a front face of the load-receiving portion,
wherein the first mounting face is coplanar with the second mounting face and the third mounting face is non-coplanar with the first and second mounting faces.

3. The mechanism according to claim 2, wherein:
the front face of the first mounting portion and the front face of the second mounting portion are step shaped, wherein the first mounting face and the second mounting face are offset inwardly from the front face.

4. The mechanism according to claim 3, wherein:
the load-receiving portion includes a main portion and an attachment portion extending forwardly from the main portion, and a connecting portion extending upwardly from the main portion, wherein the cross sectional area of the attachment portion is smaller than that of the main portion.

5. The mechanism according to claim 1, wherein the load-receiving portion is disposed wholly in the receiving space.

6. The mechanism according to claim 1, wherein:
both ends of the upper parallel-guiding member have first grooves and both ends of the lower parallel-guiding member have second grooves, wherein each of the first and the second grooves is arc-shaped or square-shaped.

7. The mechanism according to claim 6, wherein at least one of the following occurs:
a first opening divides at least one first groove into two parts; and
a second opening divides at least one second groove into two parts.

8. The mechanism according to claim 1, wherein the width of the parallel-guiding members near the end portion is wider than the width near the load-receiving portion.

9. A weigh module comprising:
a lever;
a parallel-guiding mechanism according to claim 1;
a force transmitting member connecting the load-receiving portion of the parallel-guiding mechanism to the lever; and
at least two fulcrum members connecting the first and second mounting portions of the parallel-guiding mechanism to the lever.

10. The weigh module according to claim 9, wherein the lever is a symmetrical frame structure.

11. The weigh module according to claim 10, wherein the lever comprises:
a main portion and
an internal calibration supporting member,
wherein either: the main portion and the internal calibration supporting member are formed integrally of one piece of solid material, or the internal calibration supporting member is connected to the load-receiving portion.

12. The weigh module according to claim 9, further comprising a calibration driving member with a calibration weight that can be placed on the internal calibration supporting member.

13. An electronic balance comprising a weight module according to claim 9.

* * * * *